(12) United States Patent
Kozlowski et al.

(10) Patent No.: US 11,214,375 B2
(45) Date of Patent: Jan. 4, 2022

(54) SPRING SEALED PNEUMATIC SERVO VALVE

(71) Applicant: Hamilton Sundstrand Corporation, Charlotte, NC (US)

(72) Inventors: Piotr Kozlowski, Mielec (PL); Piotr Sawicki, Bogdaniec (PL)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 93 days.

(21) Appl. No.: 15/992,227

(22) Filed: May 30, 2018

(65) Prior Publication Data
US 2018/0346128 A1 Dec. 6, 2018

(30) Foreign Application Priority Data

May 31, 2017 (EP) ..................................... 17461539

(51) Int. Cl.
*F16K 31/06* (2006.01)
*B64D 13/04* (2006.01)
(Continued)

(52) U.S. Cl.
CPC ............ *B64D 13/04* (2013.01); *F16K 11/076* (2013.01); *F16K 11/0708* (2013.01);
(Continued)

(58) Field of Classification Search
CPC ..... B64D 13/03; B64D 13/04; F16K 11/0708; F16K 11/076; F16K 11/0716; F16K 27/041; F16K 27/048; F16K 31/0613; F16K 31/0675; F16K 41/12; F16K 41/043; F16K 11/0856; H01F 7/081; F02K 1/00;
(Continued)

(56) References Cited

U.S. PATENT DOCUMENTS

| 144,463 | A | * | 11/1873 | Love | ........................ | F15B 13/04 |
| | | | | | | 137/625.69 |
| 349,275 | A | * | 9/1886 | Harris et al. | ............ | F15B 13/04 |
| | | | | | | 137/625.69 |

(Continued)

FOREIGN PATENT DOCUMENTS

FR  2993034 A1  1/2014

OTHER PUBLICATIONS

Communication pursuant to Article 94(3) EPC, for Application No. 17461539.3, dated Oct. 8, 2019, 7 pages.
(Continued)

*Primary Examiner* — Craig J Price
(74) *Attorney, Agent, or Firm* — Cantor Colburn LLP

(57) ABSTRACT

A servo valve for an actuator is described. The servo valve comprises a housing having a plurality of ports, a sleeve disposed within the housing, the sleeve comprising an axis (A), an inner surface defining a cavity for the servo valve and a plurality of metering holes, each in communication with one of the ports, and a metering rod extending axially in the cavity for reciprocation along the axis to meter flow through the metering holes. The servo valve additionally comprises a first spring seal extending between the metering rod and the sleeve to close off a first end of the cavity and a second spring seal extending between the metering rod and the sleeve to close off a second, opposite end of the cavity.

18 Claims, 9 Drawing Sheets

(51) Int. Cl.
*F16K 41/12* (2006.01)
*F16K 27/04* (2006.01)
*F16K 11/07* (2006.01)
*H01F 7/08* (2006.01)
*F16K 11/076* (2006.01)

(52) U.S. Cl.
CPC ........ *F16K 11/0716* (2013.01); *F16K 27/041* (2013.01); *F16K 27/048* (2013.01); *F16K 31/0613* (2013.01); *F16K 31/0675* (2013.01); *F16K 41/12* (2013.01); *H01F 7/081* (2013.01); *Y10T 137/86775* (2015.04)

(58) Field of Classification Search
CPC ........... B23P 15/001; Y10T 137/86622; Y10T 137/86694; Y10T 137/8671; Y10T 137/8662; Y10T 137/86702; Y10T 137/86775; F15B 13/0402; F15B 13/0407
USPC .............. 137/625.3, 625.34, 625.35, 625.64, 137/625.68, 625.69, 625.37, 625.38; 251/61, 61.1, 61.2, 61.3
See application file for complete search history.

(56) References Cited

U.S. PATENT DOCUMENTS

| | | | | |
|---|---|---|---|---|
| 369,552 | A * | 9/1887 | Poole | F15B 13/04 137/625.68 |
| 662,417 | A * | 11/1900 | Grant | F15B 13/04 137/625.68 |
| 910,225 | A * | 1/1909 | O'Bryant | F15B 13/04 137/625.68 |
| 1,046,944 | A * | 12/1912 | Bartram | F15B 13/04 137/625.68 |
| 2,217,635 | A * | 10/1940 | Bailey | F22D 5/16 122/451 R |
| 2,826,215 | A * | 3/1958 | Wolfslau | F16K 31/0693 137/454.6 |
| 2,839,079 | A * | 6/1958 | Holmes | F16K 11/0712 251/235 |
| 3,042,072 | A * | 7/1962 | Humphrey | F15C 3/04 137/454.6 |
| 3,215,159 | A * | 11/1965 | Nixon | 137/501 |
| 3,336,941 | A * | 8/1967 | English | G05D 7/0146 137/501 |
| 3,384,122 | A * | 5/1968 | Harpman | F15B 13/0431 137/625.64 |
| 3,448,959 | A * | 6/1969 | McHale | F15B 13/043 251/31 |
| 3,559,686 | A * | 2/1971 | Hoffman | F15B 13/0405 137/625.64 |
| 3,570,807 | A * | 3/1971 | Sturman | F16K 31/0682 251/65 |
| 3,592,235 | A * | 7/1971 | Fore | G05D 16/0404 137/625.66 |
| 3,623,695 | A * | 11/1971 | Hislop | F16K 11/07 251/65 |
| 3,625,246 | A | 12/1971 | Reaves | |
| 3,643,700 | A * | 2/1972 | Black | F16K 11/0716 137/625.68 |
| 3,749,128 | A * | 7/1973 | Sallberg | F15B 13/0446 137/625.61 |
| 3,794,075 | A * | 2/1974 | Stoll | F16K 11/07 137/625.66 |
| 3,823,726 | A * | 7/1974 | Akiyama | F15C 4/00 137/86 |
| 3,868,969 | A * | 3/1975 | Schwenk | F16K 11/044 137/625.5 |
| 3,896,836 | A * | 7/1975 | Labarre | G05D 23/1313 236/12.22 |
| 3,985,333 | A * | 10/1976 | Paulsen | F16K 31/0655 251/129.07 |
| 4,067,357 | A * | 1/1978 | Ruchser | F15B 13/0405 137/596.15 |
| 4,103,711 | A * | 8/1978 | Arvin | F16K 11/04 137/625.26 |
| 4,155,535 | A * | 5/1979 | Seamone | F16K 11/0708 137/625.3 |
| 4,549,467 | A * | 10/1985 | Wilden | F04B 43/0736 91/307 |
| 4,611,631 | A * | 9/1986 | Kosugi | F16K 31/0627 137/625.27 |
| 4,624,285 | A * | 11/1986 | Perach | F16K 31/0606 137/625.65 |
| 4,655,378 | A * | 4/1987 | DuFour | B65H 23/0208 137/625.68 |
| 4,719,943 | A * | 1/1988 | Perach | F16K 31/0606 137/625.65 |
| 4,741,365 | A * | 5/1988 | Van Ornum | F15B 13/0402 137/625.65 |
| 4,830,586 | A * | 5/1989 | Herter | F04B 43/0736 417/395 |
| 5,007,458 | A * | 4/1991 | Marcus | F16K 31/0634 137/625.5 |
| 5,218,997 | A | 6/1993 | Dunwoody | |
| 5,441,281 | A * | 8/1995 | Baland | F01L 25/066 277/500 |
| 6,035,895 | A * | 3/2000 | Grill | F16K 11/044 137/625.65 |
| 6,058,725 | A | 5/2000 | Monfraix et al. | |
| 6,116,276 | A * | 9/2000 | Grill | F15B 13/0405 137/596.17 |
| 6,481,689 | B2 * | 11/2002 | Grill | F15B 13/0405 251/129.07 |
| 6,488,050 | B1 * | 12/2002 | Jabcon | F15B 13/0405 137/625.27 |
| 6,684,651 | B1 * | 2/2004 | Yoshizawa | F16K 11/0655 137/625.43 |
| 7,264,223 | B2 * | 9/2007 | Fukano | G05D 7/0635 251/129.07 |
| 9,010,373 | B2 * | 4/2015 | Neff | F16K 41/12 137/625.64 |
| 10,598,194 | B2 * | 3/2020 | Gunell | F15B 13/0433 |
| 10,822,094 | B2 * | 11/2020 | Kozlowski | F16K 11/0708 |
| 2007/0045579 | A1 * | 3/2007 | Wirtl | F15B 13/0433 251/129.04 |
| 2010/0104481 | A1 * | 4/2010 | Curello | C01B 3/065 422/112 |
| 2012/0061600 | A1 | 3/2012 | Neff | |
| 2014/0326909 | A1 | 11/2014 | Ding et al. | |
| 2016/0369915 | A1 | 12/2016 | Vu | |
| 2018/0231128 | A1 * | 8/2018 | Villanueva | F16K 31/406 |
| 2018/0347721 | A1 * | 12/2018 | Kozlowski | F16K 11/0708 |

OTHER PUBLICATIONS

Extended European Search Report for International Application No. 17461539.3 dated Dec. 13, 2017, 6 pages.

* cited by examiner

SPRING SEALED PNEUMATIC SERVO VALVE

FOREIGN PRIORITY

This application claims priority to European Patent Application No. 17461539.3 filed May 31, 2017, the entire contents of which is incorporated herein by reference.

TECHNICAL FIELD

The present disclosure relates to pneumatic servo valves.

BACKGROUND

Single stage pneumatic servo valves are known for use in aircraft air management systems such as: engine bleed, cabin air conditioning, pressurization or wing and cowl anti ice protection. Such servo valves are required to operate at various pressures and temperatures depending on their location in the aircraft air management system. They are typically disposed to engage with an actuator, the actuator being further disposed to engage with an air valve such as a butterfly valve. For fast acting air valve actuators, relatively large flows are required depending on size of the actuator and the air valve slew rate. Servo valves that engage fast acting air valve actuators need to handle larger flows of fluid and provide desired output (pressure recovery) proportional to control current.

In order to handle high flow rates larger orifice areas within the servo valve are required. For flapper-nozzle type servo valves, when dealing with high flow rates, higher flow forces act in the direction of flapper movement along the nozzle orifice axis. A torque motor used in such valves is required to overcome them and this causes issues with performance stability of the flapper-nozzle servo valves.

Typical single stage pneumatic servo valves used in aircraft air management systems also experience difficulties in handling an increase of ambient fluid temperatures and supply fluid temperatures, especially in the engine high pressure bleed location where high temperature conditions exceed design limits of compounds used for O-ring and electrical insulation materials commonly used within single stage pneumatic servo valves.

SUMMARY OF THE DISCLOSURE

According to a first aspect the present disclosure can be seen to provide a servo valve for an actuator, the servo valve comprising: a housing having a plurality of ports; a sleeve disposed within the housing, the sleeve comprising an axis, an inner surface defining a cavity for the servo valve and a plurality of metering holes, each in communication with one of the ports; a metering rod extending axially in the cavity for reciprocation along the axis to meter flow through the metering holes; a first spring seal extending between the metering rod and the sleeve or housing to close off a first end of the cavity; and a second spring seal extending between the metering rod and the sleeve or housing to close off a second, opposite end of the cavity.

Viewed in another way, the present disclosure can be seen to provide a servo valve for an actuator, the servo valve comprising: a housing having a plurality of ports; a sleeve disposed within the housing, the sleeve comprising an axis, an inner surface defining a cavity for the servo valve and a plurality of metering holes, each in communication with one of the ports; a metering rod extending axially in the cavity for reciprocation along the axis to meter flow through the metering holes, wherein the metering rod is movably sealingly positioned within the cavity of the servo valve without polymeric seals and without sliding seals. Such seals might have previously included, for example, O-ring seals. Instead of such polymeric or sliding seals, according to one embodiment, a first spring seal extends between the metering rod and the sleeve or housing to close off a first end of the cavity and a second spring seal extends between the metering rod and the sleeve or housing to close off a second, opposite end of the cavity.

In addition to one or more features described above, or as an alternative to any of the foregoing embodiments, each of the spring seals may sealingly engage with both the metering rod and one of the sleeve or the housing.

In embodiments where the spring seals sealingly engage the sleeve, the sleeve may be pre-assembled with the seals in place and fitted into the housing of the servo valve as a cartridge.

In addition to one or more features described above, or as an alternative to any of the foregoing embodiments, the first and second spring seals may be configured to generate equal and opposite amounts of spring force from a given pressure within the cavity.

In addition to one or more features described above, or as an alternative to any of the foregoing embodiments, the first and second spring seals may have substantially the same spring constant in a direction along the axis.

In addition to one or more features described above, or as an alternative to any of the foregoing embodiments the first and second spring seals may comprise metal diaphragms.

In addition to one or more features described above, or as an alternative to any of the foregoing embodiments, the first and second spring seals may be made of steel.

In addition to one or more features described above, or as an alternative to any of the foregoing embodiments, the first and second spring seals may be of equal area and have matching profiles. The second spring seal may have a profile which is reversed with respect to the first spring seal.

In addition to one or more features described above, or as an alternative to any of the foregoing embodiments, the first and second spring seals may comprise bellow springs.

In addition to one or more features described above, or as an alternative to any of the foregoing embodiments, the housing may comprise a supply pressure port, an exhaust pressure port and a control pressure port, the control pressure port being in communication with the cavity through a hole positioned between metering holes for the supply pressure port and exhaust pressure port.

In addition to one or more features described above, or as an alternative to any of the foregoing embodiments, the servo valve may be a three way single stage pneumatic servo valve.

In addition to one or more features described above, or as an alternative to any of the foregoing embodiments, the metering rod may comprise metering members arranged along a rod.

In addition to one or more features described above, or as an alternative to any of the foregoing embodiments, the metering members may be secured to the rod with an interference fit.

In addition to one or more features described above, or as an alternative to any of the foregoing embodiments, the servo valve may comprise a first pair of metering holes and a second pair of metering holes, the metering holes of each pair being arranged opposite one other within the sleeve.

In addition to one or more features described above, or as an alternative to any of the foregoing embodiments, the metering holes of each pair may be equidistant from a port that the metering holes are in communication with.

In addition to one or more features described above, or as an alternative to any of the foregoing embodiments, the sleeve may be cylindrical and the metering holes may be arranged to communicate with a port via an annular recess provided in the outer surface of the sleeve.

In addition to one or more features described above, or as an alternative to any of the foregoing embodiments, the metering holes may comprise circumferentially extending slots in such an annular recess.

In addition to one or more features described above, or as an alternative to any of the foregoing embodiments, the servo valve may comprise a drive unit to reciprocate the metering rod along the axis.

In addition to one or more features described above, or as an alternative to any of the foregoing embodiments, the drive unit may be a direct single solenoid drive.

In addition to one or more features described above, or as an alternative to any of the foregoing embodiments, the drive unit may comprise ceramic insulation, for example, around coils of a winding.

In addition to one or more features described above, or as an alternative to any of the foregoing embodiments, the drive unit may comprise soft magnetic cores.

In addition to one or more features described above, or as an alternative to any of the foregoing embodiments, the housing of the drive unit may comprise stainless steel, in particular a non-magnetic stainless steel.

In addition to one or more features described above, or as an alternative to any of the foregoing embodiments, the sleeve may be secured within the housing with an interference fit.

In addition to one or more features described above, or as an alternative to any of the foregoing embodiments, the first and second spring seals may be connected to the sleeve for closing off the ends of the cavity. The sleeve may be received within the housing as a replaceable cartridge.

In addition to one or more features described above, or as an alternative to any of the foregoing embodiments, the servo valve may comprise a gasket seal for sealing against an actuator.

According to a another aspect, the present disclosure may be seen to provide an air management system comprising an actuator and a servo valve as described in any of the above statements.

According to a further aspect the present disclosure may be seen to provide a method of making a servo valve comprising: forming a plurality of ports in a housing; forming a sleeve for location within the housing, the sleeve comprising an axis, an inner surface defining a cavity for the servo valve and a plurality of metering holes, each in communication with one of the ports; introducing a metering rod axially into the cavity for reciprocation along the axis to meter flow through the metering holes; connecting a first spring seal to one or both of the metering rod and the sleeve to close off a first end of the cavity; connecting a second spring seal to one or both of the metering rod and the sleeve to close off a second, opposite end of the cavity; and sliding the sleeve within the housing.

In addition to one or more features described above, or as an alternative to any of the foregoing embodiments, the method may comprise a step of using heat to thermally expand the housing with respect to the sleeve for sliding the sleeve within the housing.

BRIEF DESCRIPTION OF THE DRAWINGS

Certain embodiments of the present disclosure will now be discussed in greater detail, by way of example only and with reference to the accompanying drawings, in which.

DETAILED DESCRIPTION

The present disclosure relates to pneumatic servo valves. In particular, it may be seen to relate to 3-way single stage electro pneumatic servo valves utilized to control air valves that manage air distribution through variety of aircraft air management systems. It describes an improved way of handling high flow rates and high ambient and supply air temperatures, while keeping the design compact and of a relatively small size. It is an alternative for traditional shear orifice type designs, and at least in the illustrated embodiments can be seen to be offering improved "flow to mass/size increase" ratio and a broader range of operating temperatures due to elimination of O-rings from the design.

Figure 2:
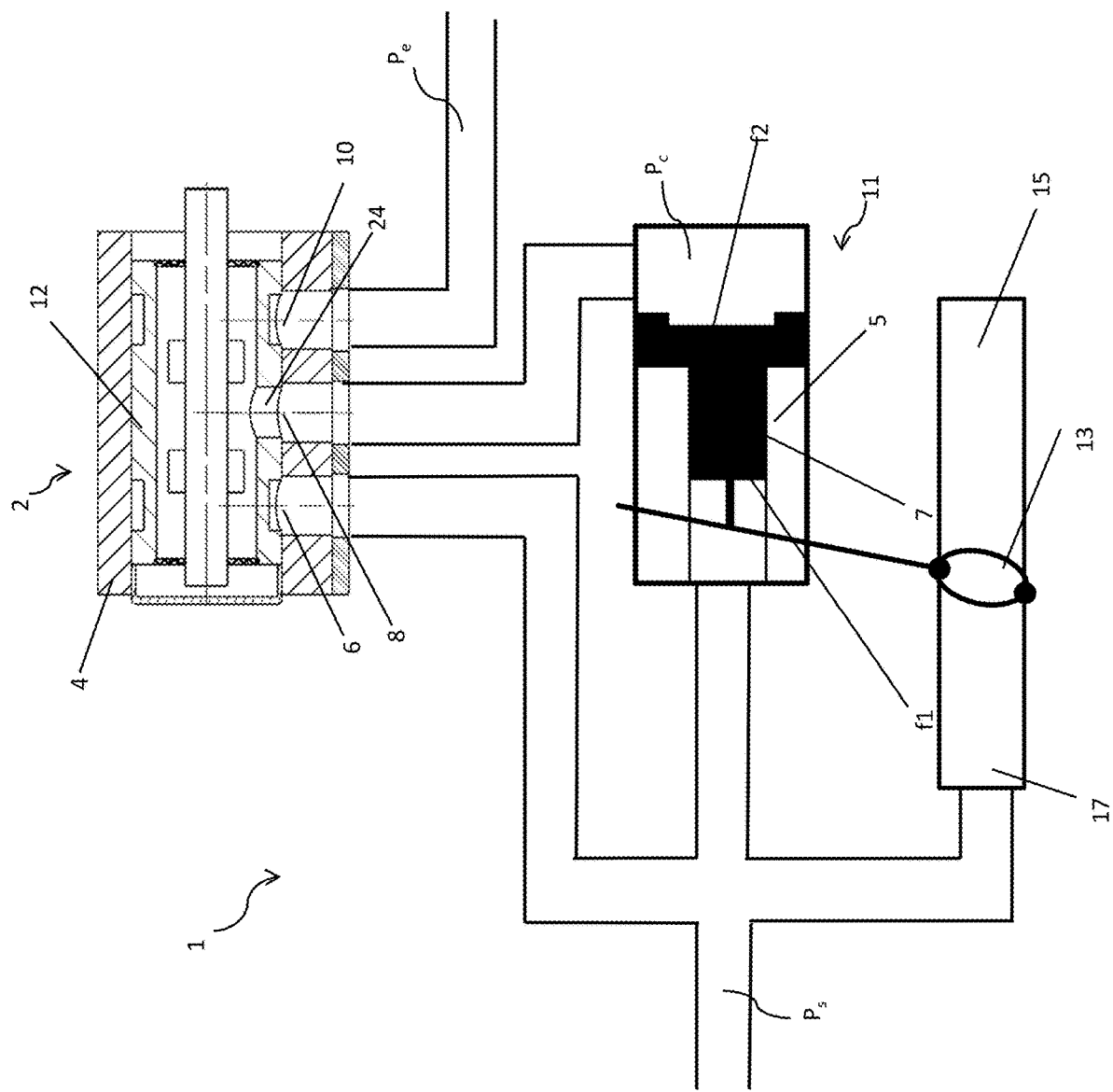
FIG. 2 is a schematic view of a servo valve connected with an actuator and a butterfly valve disposed within a duct in the same embodiment.

As shown in FIG. 2, an aircraft air management system 1 comprises a servo valve 2. The servo valve 2 may be, for example, a 3-way single stage electro pneumatic servo valve 2, as shown.

Figure 1:
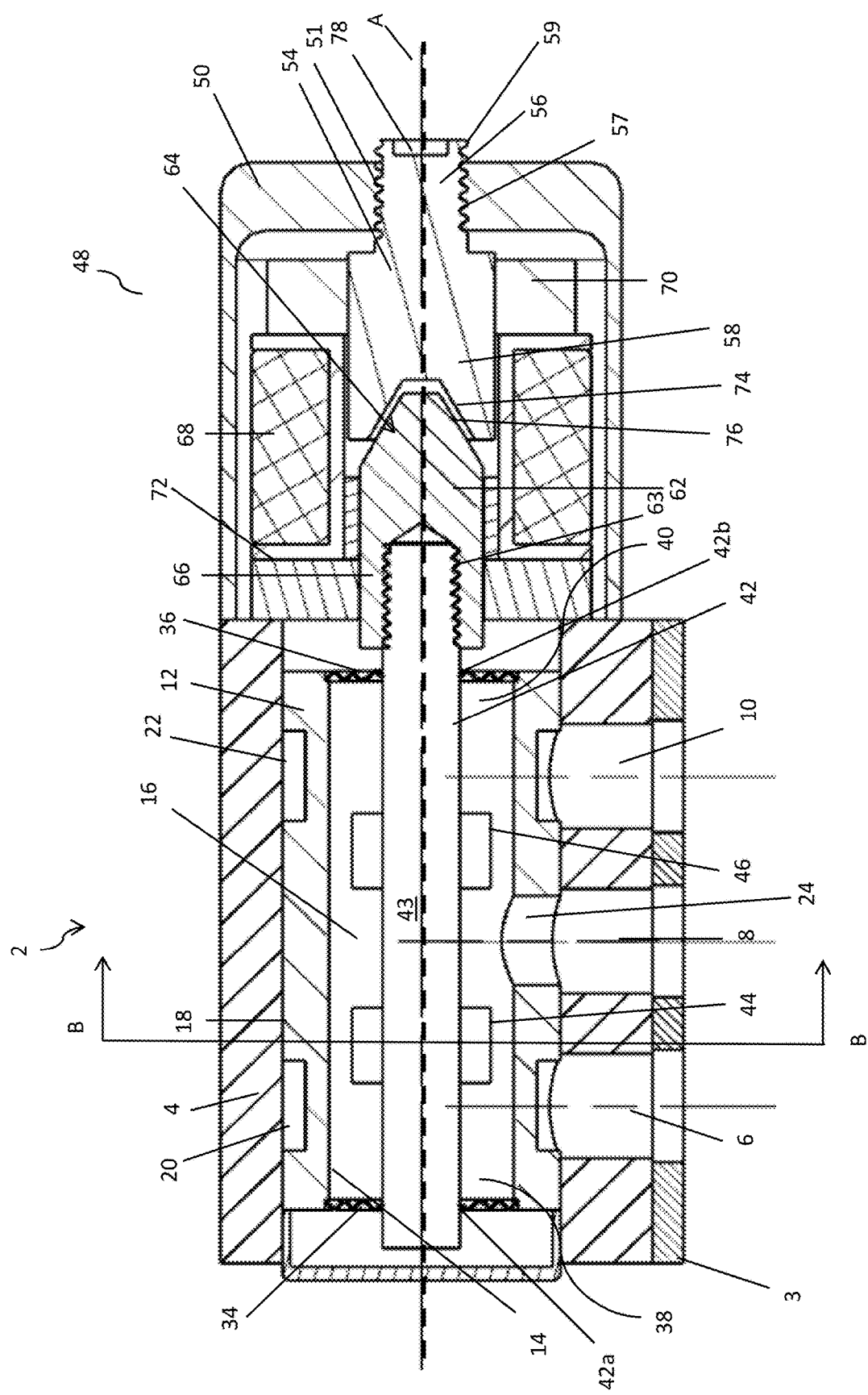
FIG. 1 is a schematic view of a servo valve in an embodiment.

The servo valve 2 is shown enlarged and in more detail in FIG. 1 and comprises a housing 4, the housing 4 having a supply pressure port 6, a control pressure port 8 and an exhaust pressure port 10. The servo valve 2 also comprises a cavity 16 (see FIG. 1), arranged generally centrally within the servo valve 2 and defining an operational axis A. The cavity 16 may be cylindrical in shape, extending along the axis A, as shown.

The ports 6, 8, 10 are provided for communicating pneumatic lines with the cavity 16, for example, a supply pressure $P_s$, a control pressure $P_c$ and an exhaust pressure $P_e$, respectively. Depending on the operation of the servo valve 2 and the pressure within the cavity 16 at a particular time, each of the ports 6, 8, 10 may act as an inlet for introducing a pneumatic fluid, such as air or other pneumatic gas, at a given pressure to the cavity 16, or as outlet for allowing the release of the fluid.

Although in the illustrated embodiment only one supply pressure port 6, one control pressure port 8 and one exhaust pressure port 10 is depicted, it is contemplated that a plurality of supply pressure ports, control pressure ports and/or exhaust pressure ports could be provided, as required for a particular situation. In addition, the ports 6, 8, 10 may be of any shape which allows a fluid to flow into and out of the cavity 16. Circular ports 6, 8, 10, can be fabricated easily, for example, by drilling holes in the housing 4.

The ports 6, 8, 10 may be provided all on one side of a housing 4 as shown for ease of fabrication and for ease of connection to a pneumatic supply and actuator 11. Other arrangements are also envisaged where one or more of the ports 6, 8, 10 are out of alignment with the others when the servo valve 2 is viewed along the axis A. Such an arrangement may be desirable where a pneumatic line is coming from a different component or direction.

Proximate the outer ends of the ports 6, 8, 10, where the ports 6, 8, 10 are to connect with a pneumatic supply, a seal 3 is provided. In the embodiment shown, a gasket seal 3 is disposed on an outer surface of the housing 4, providing a common seal 3 to each of the ports 6, 8, 10, sealing the pneumatic lines from the environment. The gasket seal 3 is also configured to seal off the supply pressure port 6, the control pressure port 8 and the exhaust pressure port 10 from one another. The gasket seal 3 may be made of a compound having greater thermal properties than silicone rubber, which is traditionally used for O-ring seals allowing broad temperature tolerances. Such materials may comprise ceramic fibres in a matrix. Through the provision of such a gasket seal 3 and other changes, O-ring seals can be avoided in the servo valve 2, enabling the servo valve 2 to be used in higher temperature environments.

The supply pressure port 6 and the control pressure port 8 may be connected to an actuator 11 as shown in FIG. 2. The actuator 11 depicted in FIG. 2 is a half area actuator and is merely exemplary of one type of actuator 11 that may be used in combination with the servo valve 2. The actuator 11 could take a number of other forms, for instance the actuator 11 could be a single acting proportional actuator, e.g., for low load applications where servo pressure acts on a single piston against a return spring. In such arrangements the spring stiffness can be set to match the supply pressure variation range. Thus the actuator 11 is not limited to the actuator configuration in the figures.

The illustrated actuator 11 has a chamber 5 with a piston 7 disposed therein. The piston 7 has a first face f1 and a second face f2. The aircraft air management system 1 and the actuator 11 are configured such that fluid entering the supply pressure port 6 also enters a first side of the actuator 11 that is defined by the first face f1 of the piston 7. The aircraft air management system 1 and actuator 11 are further configured such that fluid is able to pass between the control pressure port 8 and a second side of the actuator 11 defined by the second face f2 of the piston 7.

The aircraft air management system 1 may further comprise an air duct 15 e.g., in the form of a section of pipe which is connected into the air supply. The actuator 11 is configured such that the piston 7 engages with a valve 13 disposed within the air duct 15. The valve 13 is optionally a butterfly valve 13 that can move from an open position, whereby fluid is allowed to pass freely through the air duct 15, to a closed positon, whereby fluid is prevented from passing through the air duct 15 by the butterfly valve 13. The piston 7 is arranged to move the butterfly valve 13 between the open and closed positions, e.g., such that when the piston 7 extends fully in a direction toward the second side of the actuator 11 the butterfly valve 13 is in the open position and when the piston 7 extends fully in a direction toward the first side of the actuator 11 the butterfly valve is in the closed position.

Figure 3:
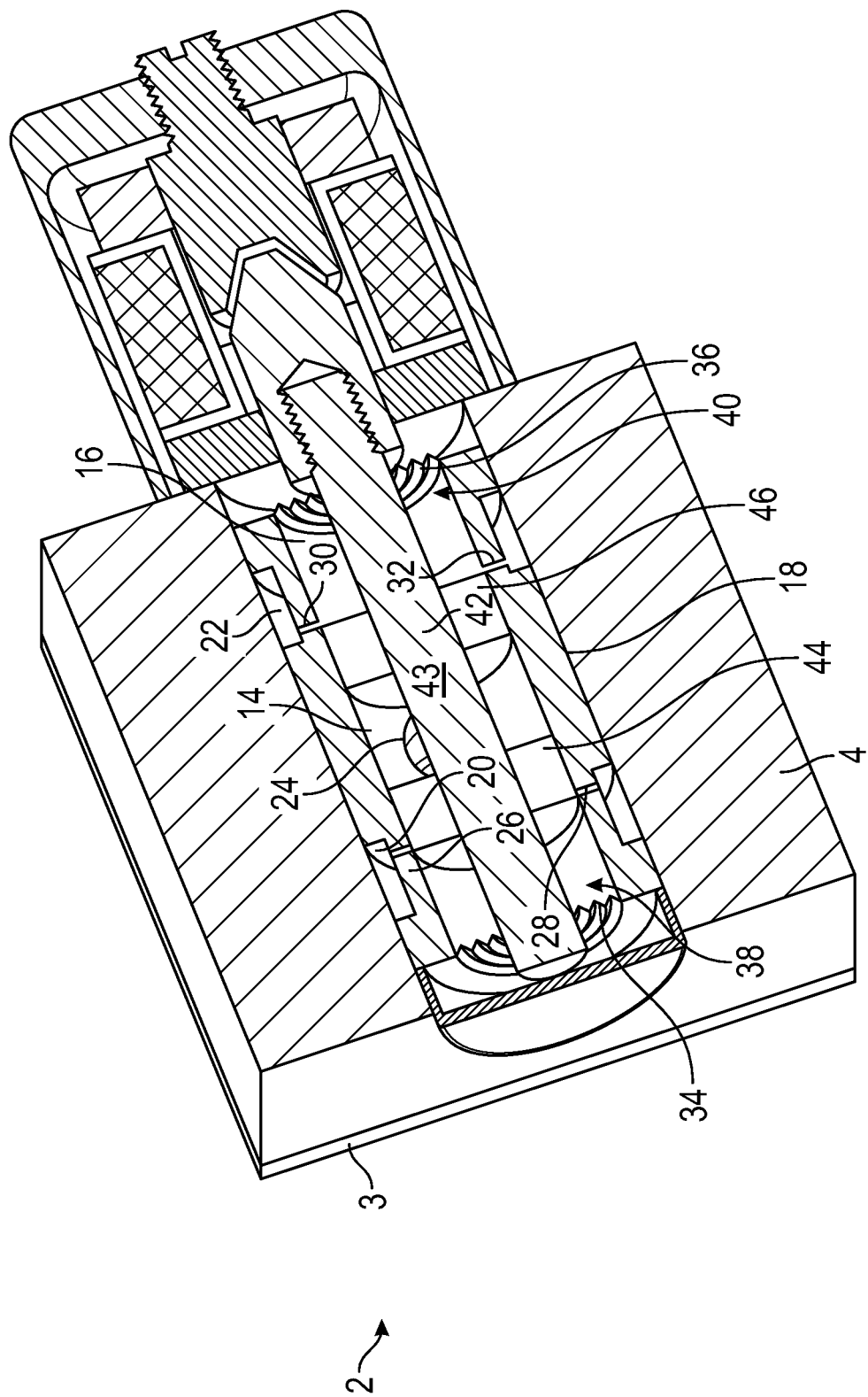
FIG. 3 shows a perspective view of a servo valve in the same embodiment.

The aircraft air management system 1, the actuator 11 and the air duct 15 are configured such that fluid entering the supply pressure port 6 and the first side of the actuator 11 also enters a first end 17 of the air duct 15. Returning to FIG. 1, the servo valve 2 can be seen to further comprise an elongate, cylindrical sleeve 12 disposed about the axis A within the housing 4. The sleeve 12 has an inner surface 14 which defines a radial extremity of the cavity 16 within the servo valve 2. It also has an outer surface 18, at least a portion of which may be in contact with the housing 4. As shown in FIG. 3, the sleeve 12 may have annular recesses 20, 22 defined in its outer surface 18 that extend around a circumference of the sleeve 12. Each recess 20, 22 may connect with one of the ports 6, 8, 10 as shown, for example, the supply pressure port 6 or the exhaust pressure port 10, providing a path for fluid to flow around the sleeve 12 to reach the cavity 16 or escape therefrom.

Although the sleeve 12 is described as being cylindrical, it is envisaged that the sleeve might take other elongate shapes, for example, oval or a polygonal prismatic shape such as hexagonal, cuboid or triangular faced prism, with the internal surface of the housing 4 shaped accordingly. While a cylindrical sleeve 12 within a cylindrical cavity of a housing 4 offers a simple fabrication route through machining, other forms of production such as 3D printing are becoming more widespread and may offer opportunities for other shapes.

Optionally, the sleeve 12 is installed as a sliding interference fit (e.g., a light interference fit) within the housing 4 and can be removed from the housing 4 so as to improve upon the line replicability of the servo valve 2. A cylindrical sleeve 12 would make such sleeve replacement simpler. The outer surface 18 of the sleeve 12 may be dimensioned to provide a tight fit within the housing 4 and may require thermal expansion of the housing 4 to install the sleeve 12 within the housing 4. Alternatively, the sleeve 12 may be locked in position via a locking mechanism locking mechanism within the housing 4. Both types of installation allow for the sleeve 12 to be removed from the housing 4 and so also improves upon the line replicability of the servo valve 2.

The sleeve 12 has a plurality of holes 24, 26, 28, 30, 32, e.g., five holes defined therein (as shown more clearly in FIGS. 3 and 5), four of which may be metering holes 26, 28, 30, 32. Each hole 24, 26, 28, 30, 32 penetrates through the sleeve 12 from the inner surface 14 to the outer surface 18 such that each hole 24, 26, 28, 30, 32 is in communication with one of the supply pressure port 6, the control pressure port 8 and the exhaust pressure port 10, and the respective supply pressure, control pressure and exhaust pressure lines $P_s$, $P_c$, $P_e$.

Whilst in the illustrated embodiment, five holes are present, it is contemplated that the sleeve 12 may comprise any number of holes provided there is at least one hole in communication with each of the ports 6, 8, 10, e.g., the supply pressure port 6, control pressure port 8 and the exhaust pressure port 10. Some of the holes, for example, the metering holes 26, 28, 30, 32 may be arranged as pairs, one of the pair disposed opposite another, e.g. a pair of metering holes 26, 28 in communication with the supply pressure port 6 and a pair of metering holes 30, 32 in communication with the exhaust pressure port 10.

A first hole 24 is arranged to be in communication with the control pressure port 8. It may be disposed such that the centre of the first hole 24 is equidistant from a first end 38 and a second end 40 of the cavity 16.

The first hole 24 is disposed adjacent the control pressure port 8 such that the first hole 24 is generally the same size as and aligns with the control pressure port 8. The first hole 24 may be circular as shown. The first hole 24 may be effectively a continuation of the control pressure port 8, though may also be slightly smaller than the control pressure port 8 to provide precise control over the flow of pneumatic fluid through the control pressure port 8. For example, as will become apparent later, the sleeve 12 can be machined or otherwise fabricated to a high level of precision and the housing 4 can be machined or otherwise fabricated to a lower level of precision, reducing production costs of the final servo valve 2. The first hole 24 and the control pressure port 8 are configured such that fluid exiting the control pressure port 8 enters the sleeve 12 through the first hole 24.

As can be seen in FIG. 3, the first hole 24 has a larger area than the other holes 26, 28, 30, 32, which are metering holes. This larger area allows for larger flow rates of pneumatic fluid to pass through, into and out of the cavity 16. The smaller holes, i.e., the metering holes 26, 28, 30, 32, are configured to control the flow of fluid, to meter the flow into and out of the cavity 16.

As shown in FIG. 3, a second hole 26 and a third hole 28 are disposed to be in communication with the supply pressure port 6 at a position proximate the first end 38 of the cavity 16. The second and third holes 26, 28 are a first pair of metering holes and are provided in the first annular recess 20 in order to communicate with the supply pressure port 6. In this embodiment, both of these metering holes 26, 28 are in the form of axially aligned, circumferentially extending slots, in particular having an arcuate shape with a rectangular opening projected onto the inner surface 14 of the sleeve 12. However, other shapes may also be appropriate.

Figure 4:
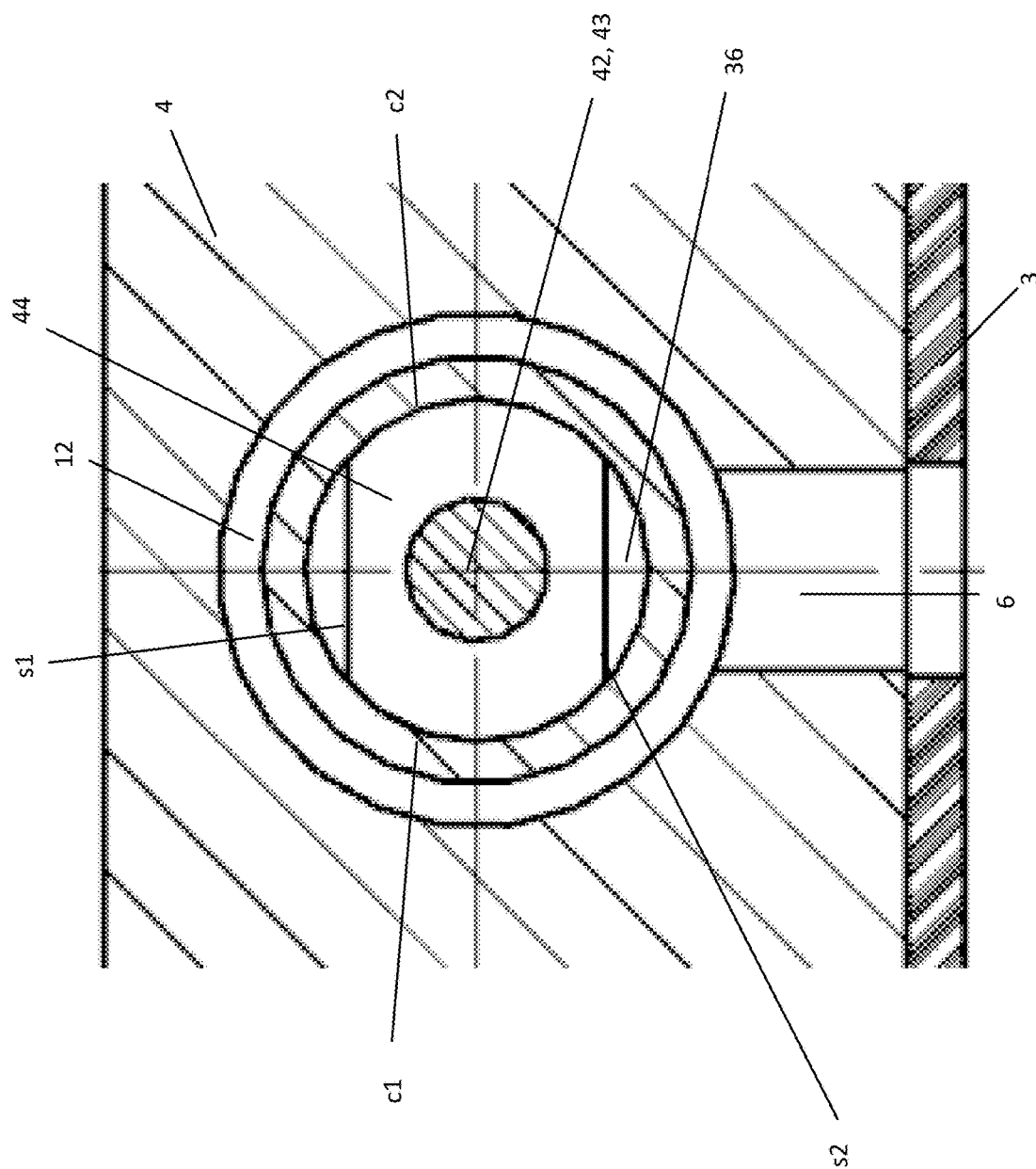
FIG. 4 is a cross-sectional view of a servo valve taken along line B-B of FIG. 1.

The first pair of metering holes 26, 28 may be disposed at diametrically opposite sides of the sleeve 12 from one another in order to balance pressures on a metering member 44 arranged to meter flow into the cavity 16. As can be seen in FIGS. 3 and 4 when the sleeve 12 is viewed along the axis A, the second and third holes 26, 28 are disposed perpendicular to the first hole 24. In this way, flow rates from the supply pressure port 6 around each path of the first recess 20 to the respective second and third holes 26, 28 may be, as far as possible, balanced.

It is, however envisioned that any spatial relationship between the first pair of metering holes 26, 28 with respect to the first hole 24 may be suitable, as long as flow rates and flow pressures are reasonably balanced, e.g., by arranging metering holes symmetrically in the sleeve 12.

The second hole 26 and the third hole 28 are configured such that fluid passing through the supply pressure port 6 enters the sleeve 12 in a controlled manner through the restricted openings of the metering hole 26, 28.

With continued reference to FIG. 3, a fourth hole 30 and a fifth hole 32 are disposed to be in communication with the exhaust pressure port 10 at a position proximate the second end 40 of the cavity 16. The fourth and fifth holes 30, 32 are a second pair of metering holes and may be disposed at diametrically opposite sides of the sleeve 12 from one another, in the same way as the first pair of metering holes 26, 28. The fourth and fifth holes 30, 32, may also be in the form of aligned, circumferentially extending slots, in particular of an arcuate, rectangular shape, which penetrate through the sleeve 12 from the inner surface 14 to the outer surface 18 of a second annular recess 22 in the sleeve 12. However, as with the first pair of metering holes 26, 28, other metering hole shapes could be used.

The use of such slots allows the open area of the metering holes 26, 28, 30, 32 to be increased linearly as they are uncovered by a metering member 44, while at the same time minimising the distance that the metering member 44 must move to open and close off the metering holes 26, 28, 30, 32.

The first pair of metering holes 26, 28 may be identical in shape and dimension to the second pair of metering holes 30, 32.

As seen in the figures, when the sleeve 12 is viewed along the axis A, the fourth and fifth holes 30, 32 are disposed perpendicular to the first hole 24. The second pair of metering holes 30, 32 may mirror the position of the first pair of metering holes 26, 28; the servo valve 2 may have symmetry about the first hole 24 communicating with the control pressure port 8. It is, however, envisaged that any spatial relationship between these metering holes 30, 32 and the first hole 24 is suitable provided that flows are reasonably balanced.

The fourth hole 30 and the fifth hole 32 are configured such that fluid exiting the sleeve 12 through the restricted openings of these metering holes 30, 32 does so in a controlled manner and then passes through the exhaust pressure port 10. There may be a linear flow to displacement relationship, as with the first pair of metering holes 26, 28.

The area of the metering holes 26, 28, 30, 32 described herein may be chosen dependent upon the desired flow capacity requirements of the servo valve 2. In addition or alternatively, the total number of metering holes disposed within the sleeve 12 may be varied in order to provide a greater overall area for fluid inlet/outlet to the sleeve 12 in order to achieve a desired flow capacity through the servo valve 2. Thus in some arrangements it may be desired to provide more than two metering holes 26, 28, 30, 32 for the supply port 6 and the exhaust port 10, for example, there may be three, four or other number of metering holes.

The exhaust pressure port 10 may lead to an exhaust pressure line $P_e$ in a manifold as shown, or may vent straight to outside of the servo valve 2, as desired. An advantage of this servo valve 2 is that it can be used in higher temperature environments. Under such conditions, it may be desirable to transport the heated exhaust fluid from the servo valve 2 to a different area of the engine or aircraft where the heated fluid can be utilised or vented, e.g., externally of the aircraft.

The servo valve 2 further comprises a metering rod 42 disposed in the cavity 16 that extends along the axis A. It may extend beyond the cavity 16 too, as shown in FIG. 1, extending through the first end 38 of the cavity 16 and the second end 40 of the cavity 16, as will be discussed further below. The metering rod 42 is arranged for reciprocating movement along the axis A. The metering rod 42 comprises metering members 44, 46; namely a first metering member 44 and a second metering member 46. Whilst the illustrated embodiment comprises two metering members 44, 46, it is contemplated that the metering rod 42 may comprise three or more metering members as necessary in a particular set up.

The first metering member 44 and second metering member 46 may be independent of one another and/or may be identical in dimension. For example, the metering members 44, 46 may comprise substantially disc-shaped elements that are mounted on a central rod 42 by an interference fit. The metering members 44, 46 and central rod 43 may comprise any suitable high temperature metal.

The metering members 44, 46 may comprise apertures or flats which allow pneumatic fluid to pass from one side to the other within the cavity 16. In addition or alternatively, one or more channels could be provided in the inner surface 14 of the sleeve 12 to allow pneumatic fluid to flow around the perimeter of the metering members 44, 46.

The positions of the metering members 44, 46 on the metering rod 42 may be adjusted through thermally expanding the metering member 44, 46 with respect to the metering rod 42 and sliding it along the metering rod 42. This allows for fine adjustment of the servo valve 2 without having to resort to grinding the metering members 44, 46.

However, other configurations are also envisaged. The metering members 44, 46 could be fixed in position, e.g., through brazing or welding, or could be integral with the metering rod 42, e.g., machined from the same cylinder of material and ground to final dimensions.

In the illustrated embodiment, the metering members 44, 46 are located along the metering rod 42 such that a surface of the first metering member 44 closest to the first end 38 of the sleeve 12 and a surface of the metering member 46 closest to the second end 40 are separated by a distance equal to the separation between a mid-point of the second and third holes 26, 28 along the axis A and a mid-point of the third and fourth holes 30, 32 along the axis A. To put this another way, the distance between a surface of the first metering member 44 closest to the first end 38 of the sleeve 12 and a surface of the metering member 46 closest to the second end 40 may be equal to the length of the land between the pairs of metering holes plus the axial dimension of one pair of the metering holes 26, 28, 30, 32.

In this way, as the metering rod 42 reciprocates along the axis A, one pair of metering holes 26, 28 is being opened while another pair of metering holes 30, 32 is being closed off, and vice versa.

The purpose of the metering members 44, 46 is to meter, as precisely as possible, the flow into and out of the cavity 16 through the two pairs of metering holes 26, 28, 30, 32. This is achieved by the metering members 44, 46 sliding over to occlude and reveal these metering holes 26, 28, 30, 32, thereby preventing and allowing communication respectively with the supply pressure port 6 and the exhaust pressure port 10. For reasons of calibration, it can be advantageous for the revealed area of the metering holes 26, 28, 30, 32 to increase and decrease linearly with reciprocation of the metering rod 42.

The metering members 44, 46 are not pistons which seal off one portion of the cavity 16 from another; instead paths are provided for the pneumatic fluid to flow around the edge of or through the metering members 44, 46, from one side of a metering member 44, 46 to another.

As shown in FIG. 4, the metering members 44, 46 may appear to have an elongate, almost stadium like cross section, where each metering member 44, 46 has two opposed flat surfaces s1, s2 following opposed chords of an otherwise circular perimeter. The flat surfaces s1, s2 create gaps through from one side of the metering member 44, 46 to the other where the perimeter of the metering member 44, 46 departs from the inner surface 14 of the sleeve 12. Two opposed curved surfaces c1, c2 are arranged at either end of these flat surfaces s1, s2, the two curved surfaces conforming to the shape of the inner surface 14 of the sleeve 12 such that the curved surfaces c1, c2 contact the inner surface 14 of the sleeve 12 to occlude and reveal the respective metering holes 26, 28, 30, 32.

The metering rod 42 is movably sealingly positioned within the cavity 16 of the servo valve 2 without polymeric seals and without sliding seals. As can be seen in FIG. 3, the servo valve 2 further comprises a first spring seal 34 disposed within the housing 4 at a first end 38 of the sleeve 12 and a second spring seal 36 disposed within the housing 4 at a second end 40 of the sleeve 12. The spring seals 34, 36 effectively replace conventional arrangements where O-ring seals would have been used to seal the metering rod 42 and provide the working cavity 16 within a valve housing 4. As a result, better operating temperature ranges can be achieved.

The first spring seal 34 may be attached to the metering rod 42 at a first point 42a and the second spring seal 36 may be attached to the metering rod 42 at a second point 42b. The ends of the metering rod 42 may extend beyond the first and second points 42a, 42b, into an internal space of the housing.

Each of the spring seals 34, 36 sealingly engage with both the metering rod and one of the sleeve 16 or the housing 4. In embodiments where the first and second spring seals 34, 36 are connected to the sleeve 12 for closing off the ends of the cavity 16, the sleeve 12 can be slid into the housing 4 as a replaceable cartridge with the spring seals 34, 36 already in place.

The first spring seal 34 is arranged to close off the first end 38 of the sleeve 12 and the second spring seal 36 is arranged to close off the second end 40 of the sleeve 12, such that the cavity 16 is fluidly sealed at the first and second ends 38, 40 by the first and second spring seals 34, 36, respectively.

The first and second spring seals 34, 36 are configured and arranged such that the spring forces from the internal pressure within the cavity 16 are balanced. For example, the first and second spring seals 34, 36 may have substantially the same spring constant in a direction along the axis A. The first and second spring seals 34, 36 may comprise metal diaphragms. The metal may have high elasticity, for example, it might be spring steel, in particular a non-magnetic spring steel. The first and second spring seals 34, 36 may be of equal area and have matching profiles, the second spring seal 36 reversed with respect to the first spring seal 34.

Thus the first spring seal 34 exerts a component of spring force on the metering rod 42 along the axis A resulting from the internal pressure within the cavity 16 that is equal and opposite to a component of spring force exerted by the second spring seal 36 on the metering rod 42 along the axis A resulting from the same internal pressure within the cavity 16.

Displacement of the metering rod 42 along the axis A by a drive unit 48 will generate other components of spring force which will urge the metering rod 42 to return back to its neutral position. Additional forces may also be present from pressure on a butterfly valve associated with the servo valve 2.

Figure 8:
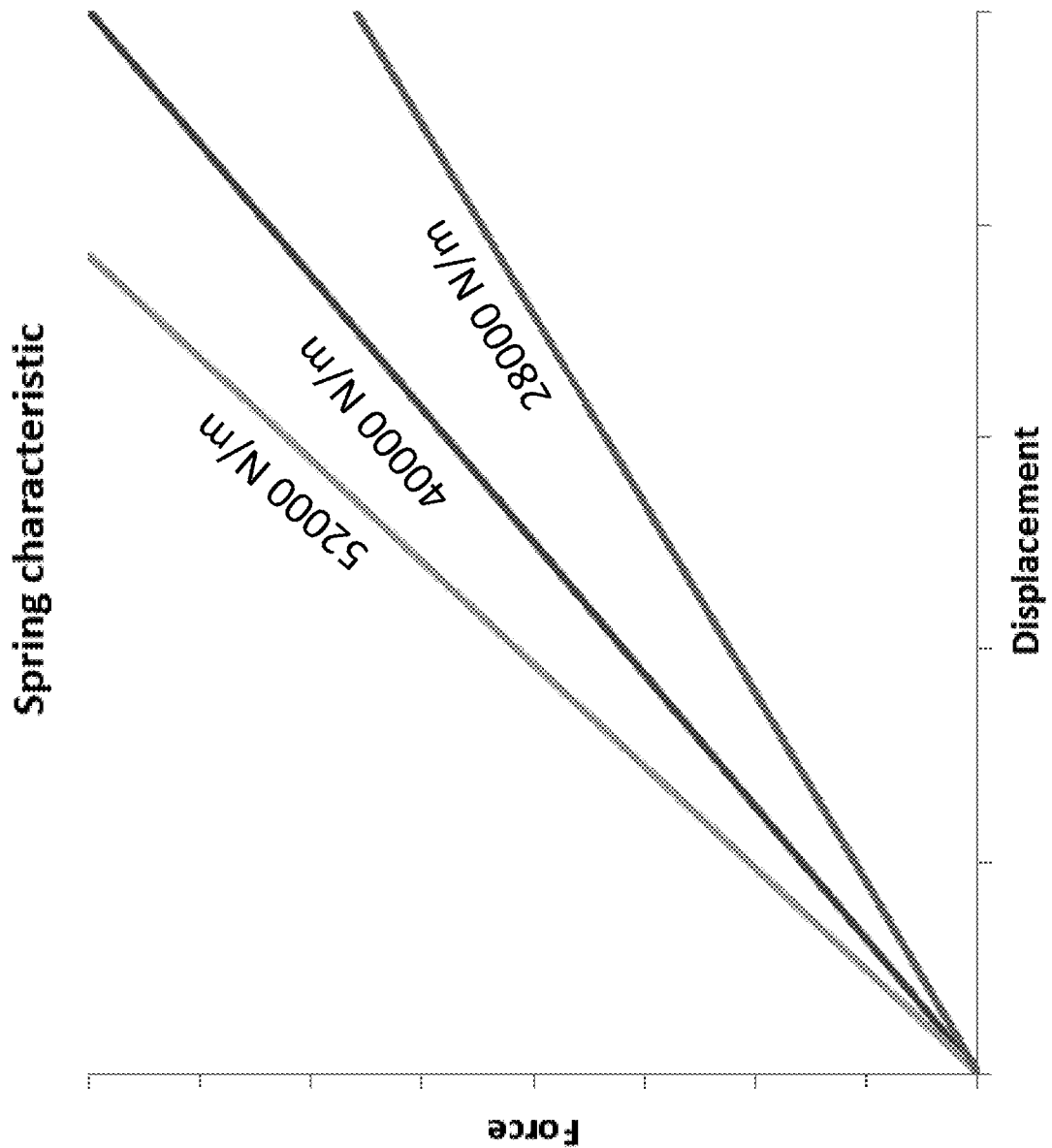
FIG. 8 is a graph showing a substantially linear spring characteristic of a spring seal comprised within a servo valve in an embodiment.
Figure 9:
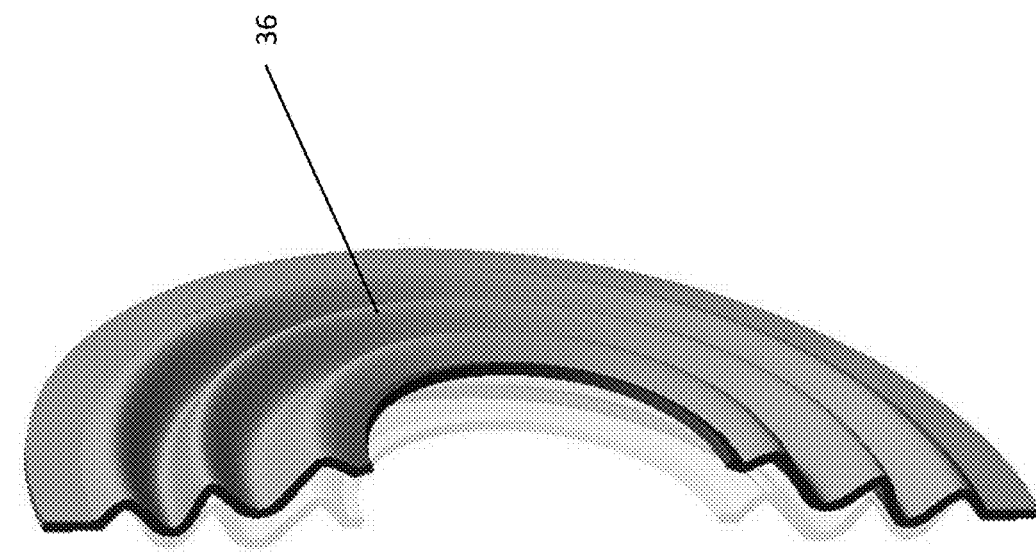
FIG. 9 shows two views of a bellow type spring seal in a deformed and in an un-deformed state.
Figure 9:
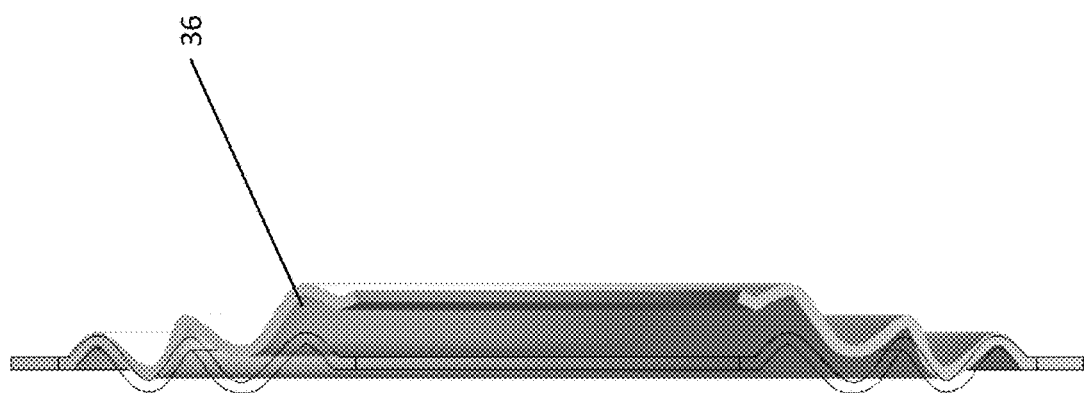

The spring seals 34, 36 may comprise a range of different profiles to provide a diaphragm between the metering rod 42 and the sleeve 12. As demonstrated by FIG. 9, the two spring seals 34, 36 may, optionally, be in the form of bellows. The spring seals 34, 36, may for example, comprise an undulating profile in a radial direction of the servo valve 2. It may comprise a sinusoidal profile of reducing displacement in the radial direction. In this way, with the undulating profile, the spring deformation of the spring seals 34, 36 along the axis A may give rise to a substantially linear relationship with spring force as shown in FIG. 8. As can be seen in exemplary embodiment of FIG. 8, the spring constant (force/displacement) of the spring seals 34, 36 may be between 28000 N $m^{-1}$-52000 N $m^{-1}$ for certain applications By way of example, the spring constant of the spring seals 34, 36 may be 40000 N $m^{-1}$.

In the illustrated embodiment, the first spring seal 34 and the second spring seal 36 are depicted as being identical in surface area, having an outer radius determined by the size of the sleeve 12 and an inner radius determined by the cross-section of the metering rod 42 at points 42a and 42b where the spring seals 34, 36 are mounted. In theory, the cavity 16 could vary in diameter and the spring seals 34, 36 could differ in size, provided that the spring constants of the first spring seal 34 and the second spring seal 36 are adjusted accordingly, so that the first and second spring seals 34, 36 always provide an equal and opposite spring force component resulting from the internal pressure to the metering rod 42. One or both of the spring seals 34, 36 could instead connect to the housing 4, as desired.

The servo valve 2 is configured to meter pneumatic fluid to the actuator 11 via movement of the metering rod 42 along the axis A. Three non-limiting positions of the metering rod 42 with respect to the sleeve 12 and housing 4 will now be described to demonstrate how the servo valve 2 is able to meter fluid to the actuator 11.

Figure 5:
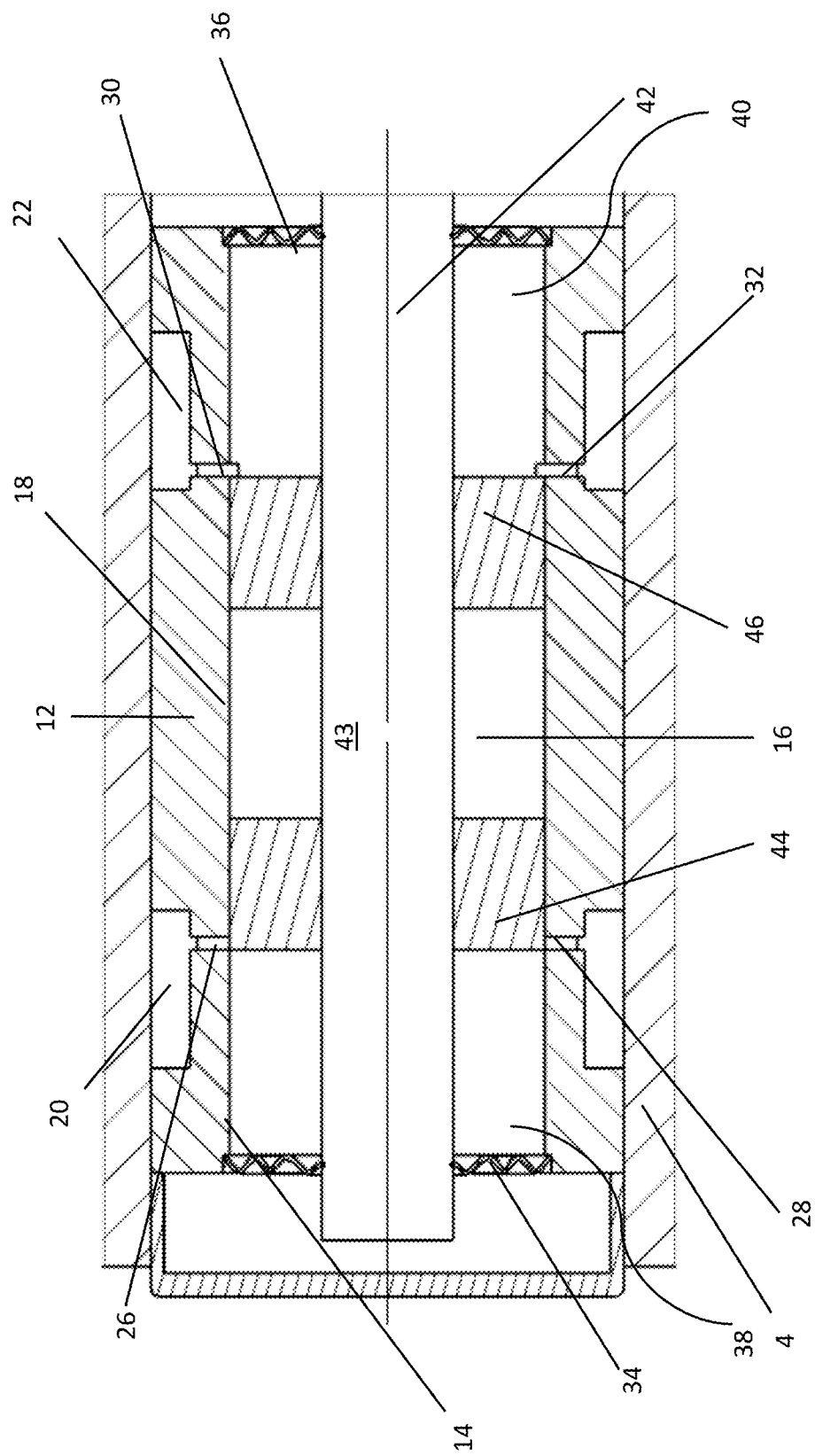
FIG. 5 is a close up of the metering rod in a first position of the servo valve in the same embodiment.

In a first position, as demonstrated in FIG. 5, when an operating solenoid coil of the drive unit 48 is de-energised, the metering rod 42 is disposed along the axis A toward the first end 38 of the cavity 16 such that the first metering member 44 overlaps (occludes) and seals the first pair of metering holes 26, 28. Thus, the pneumatic fluid that is supplied through the pressure supply port 6 is prevented from entering the cavity 16 by the first metering member 44 blocking its path. In the first position, the second metering member 46 is simultaneously displaced toward the first end 38 of the cavity 16 relative to the second pair of metering holes 30, 32 (i.e., they are open) such that fluid in the cavity 16 can pass freely into the exhaust pressure port 10.

When the metering rod 42 is in the first position the first spring seal 34 and the second spring seal 36 are at an equilibrium position such that the first spring seal 34 and the second spring seal 36 have no relative bias along the axis A.

Whilst the metering rod 42 is in the first position, fluid in the second side of the actuator 11 is free to pass through the control pressure port 8 into the cavity 16 and then, subsequently, out of the cavity 16 through the second pair of metering holes 30, 32 into and through the exhaust pressure port 10. As the fluid passes from the second side of the actuator 11 into the cavity 16, a pressure corresponding to the exhaust pressure is reached in the cavity 16 and applied to the first spring seal 34 and the second spring seal 36 by this fluid. The same pressure is experienced by both spring seals 34, 36, and as such, the force acting on the first spring seal 34 from the introduction of this fluid is equal and opposite to the force acting on the second spring seal 36 from the introduction of this fluid. Thus, there is no net force acting on the metering rod 42 as a result of the pressure within the fluid, and as result, there is also no net movement of the metering rod 42 arising from the pressure within the fluid.

Figure 6:
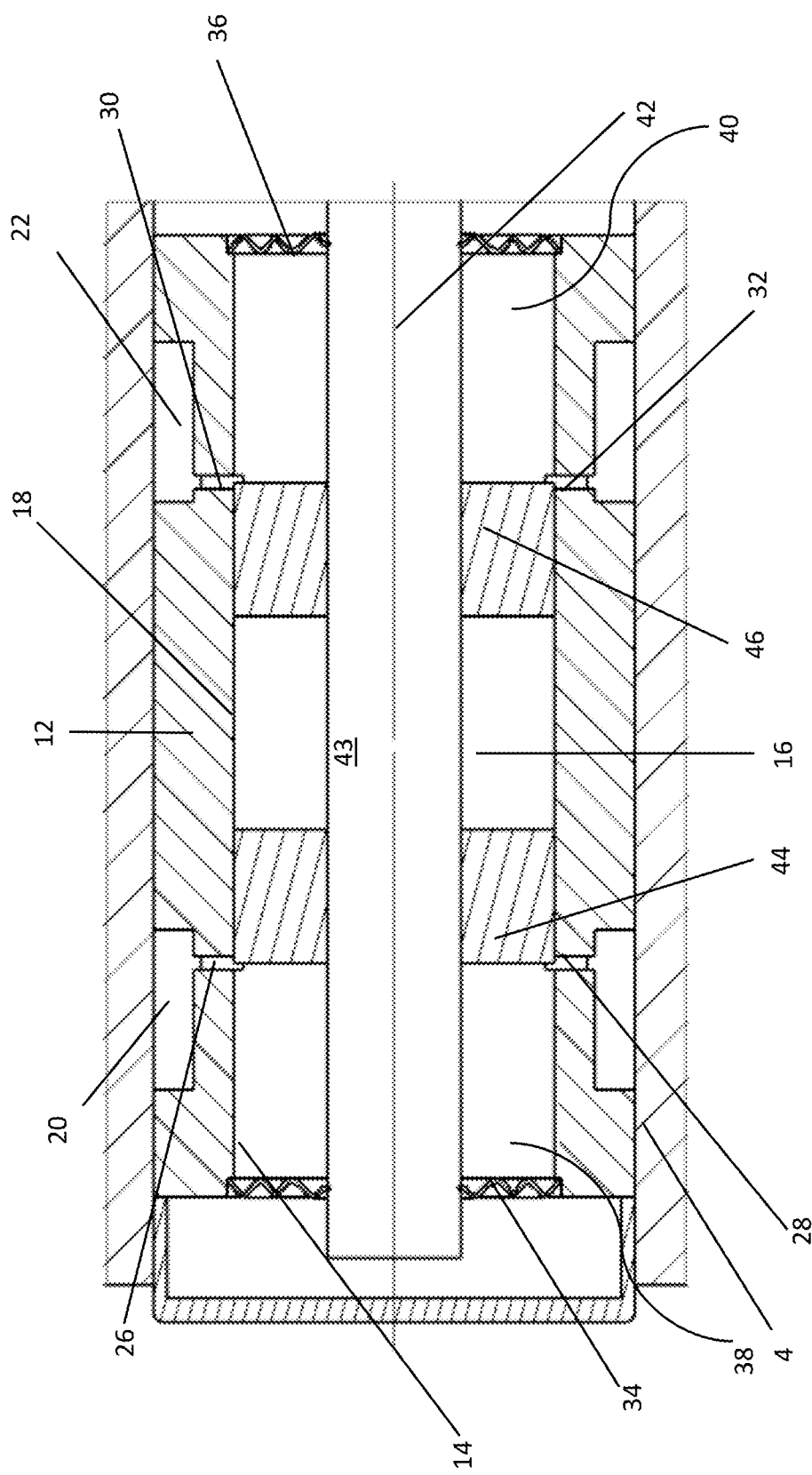
FIG. 6 is a close up of the metering rod in a second position of the servo valve in the same embodiment.

Also in the first position, the fluid in the second side of the actuator 11 is allowed to pass into the exhaust pressure port 10 via the cavity 16. Thus, there is a reduced fluid pressure in the second side of the actuator 11. As a result, the force applied to the second face f2 of the piston 7 is also reduced. The force acting on the first face f1 of the piston 7 is larger than the force acting on the second face f2 of the piston 7, so the piston 7 is urged to extend in a direction toward the second side of the actuator 11. In addition to the forces acting on the piston 7 from the fluid pressure acting on its faces f1, f2, the supply pressure $P_s$ entering the first side 17 of the air duct 15 simultaneously acts on the butterfly valve 13. The force produced by the interaction of the supply pressure $P_s$ with the butterfly valve 13 in turn acts on the piston 7. The output force from the actuator may increase with the supply pressure and match the increase in load on the butterfly valve. Due to the 2 to 1 area ratio in the exemplary embodiment, servo pressure (control pressure) is one-half of the supply pressure in the balanced mode (neglecting butterfly loads). In a control mode, servo pressure may be modulated to overcome the butterfly loads, causing the valve to move in response to exerted current to desired butterfly openings. In a second position, as demonstrated by FIG. 6, when a solenoid coil of the drive unit 48 is energised by 50%, the metering rod 42 is disposed such that the first metering member 44 overlaps with and seals 50% of the area of the first pair of metering holes 26, 28. Thus, fluid in the supply pressure port 6 can pass into the cavity 16 (and build up pressure in this cavity 16) via the second and third holes 26, 28 at a flow rate determined by the area of the metering holes 26, 28 that has been uncovered. In the second position, the second metering member 46 is simultaneously positioned such that it overlaps with and seals 50% of the area of the second pair of metering holes 30, 32.

Thus, fluid in the cavity is able to pass into the exhaust pressure port 10 at a flow rate determined by the uncovered area of the fourth and fifth holes 30, 32. As the areas of the metering holes 26, 28, 30, 32 are equal, when the metering rod 42 is in the second position the flow rate of fluid supplied to the cavity 16 through the first pair of metering holes 26, 28 (second and third holes 26, 28) is equal to the flow rate of fluid exiting the cavity 16 through the second pair of metering holes 30, 32 (fourth and fifth holes 30, 32). Since fluid enters the cavity 16 from the supply pressure port 6 at a rate that is equal to fluid exiting the cavity 16 through the exhaust pressure port 10, the pressure within the cavity 16 is equal to the pressure of the fluid in the second side of the actuator 11. By controlling the position of the metering rod 42 around this 50% position, the pressure can be modulated through alternating the balance of the flow through the different pairs of metering holes 26, 28, 30, 32.

In a steady state, that is when the butterfly is at a desired position and is not modulating, there is no flow to or from the actuator 11 via the pressure control line $P_c$. This means that whatever amount of fluid enters cavity 16, the same amount will leave it. When there is 50% overlap the flow rate through the valve 2 (from supply port 6 to exhaust port 10) is highest. As the metering rod 42 is displaced along the axis A in one or other direction to make the overlap closer to 40% or 60% for either pair of metering holes 26, 28, 30, 32, the flow rate decreases. Flow rate through the servo valve 2 (from the supply port 6 to the exhaust port 10, with the pressure in the control port 8 in equilibrium with the cavity pressure) as a function of control current may have a generally parabolic profile.

When the metering rod 42 is in the second position the first spring seal 34 and the second spring seal 36 are also deformed against their spring bias in a direction along the axis A away from the first end 38 of the cavity 16. The first spring seal 34 and the second spring seal 36 are deformed by an equal displacement along the axis A such that the volume of the cavity 16 remains constant.

The pressure applied to the first spring seal 34 by the fluid in the cavity 16 and second side of the actuator 11 is equal to the pressure applied by the fluid to the second spring seal 36. As such, the force acting on the first spring seal 34 from the internal pressure of this fluid is equal and opposite to the force acting on the second spring seal 36. Thus, there is no net force acting on the metering rod 42 as a result of the pressure in the fluid, and so there is no displacement of the metering rod 42 as a result of the internal pressure within the cavity 16.

In the second position, fluid in the second side of the actuator 11 applies a control pressure to the second face f2 of the piston 7 which is different to the supply pressure in the first side of the actuator 11 applied to the first face f1. The piston 7 is, hence, forced to move in a direction toward the second side of the actuator 11 until the force applied to the first face f1 of the piston 7 is equal to the force applied to the second face f2 of the piston 7 (neglecting butterfly loads). I.e., the piston is forced to move to a position where the below equation is satisfied:

$$A_{f1}P_S = A_{f2}P_C$$

where $A_{f1}$ is the area of the first face f1 of the piston 7, $A_{f2}$ is the area of the second face f2 of the piston, $P_s$ is the supply pressure supplied to the first side of the actuator 11, $P_c$ is the control pressure in the second side of the actuator 11.

Figure 7:
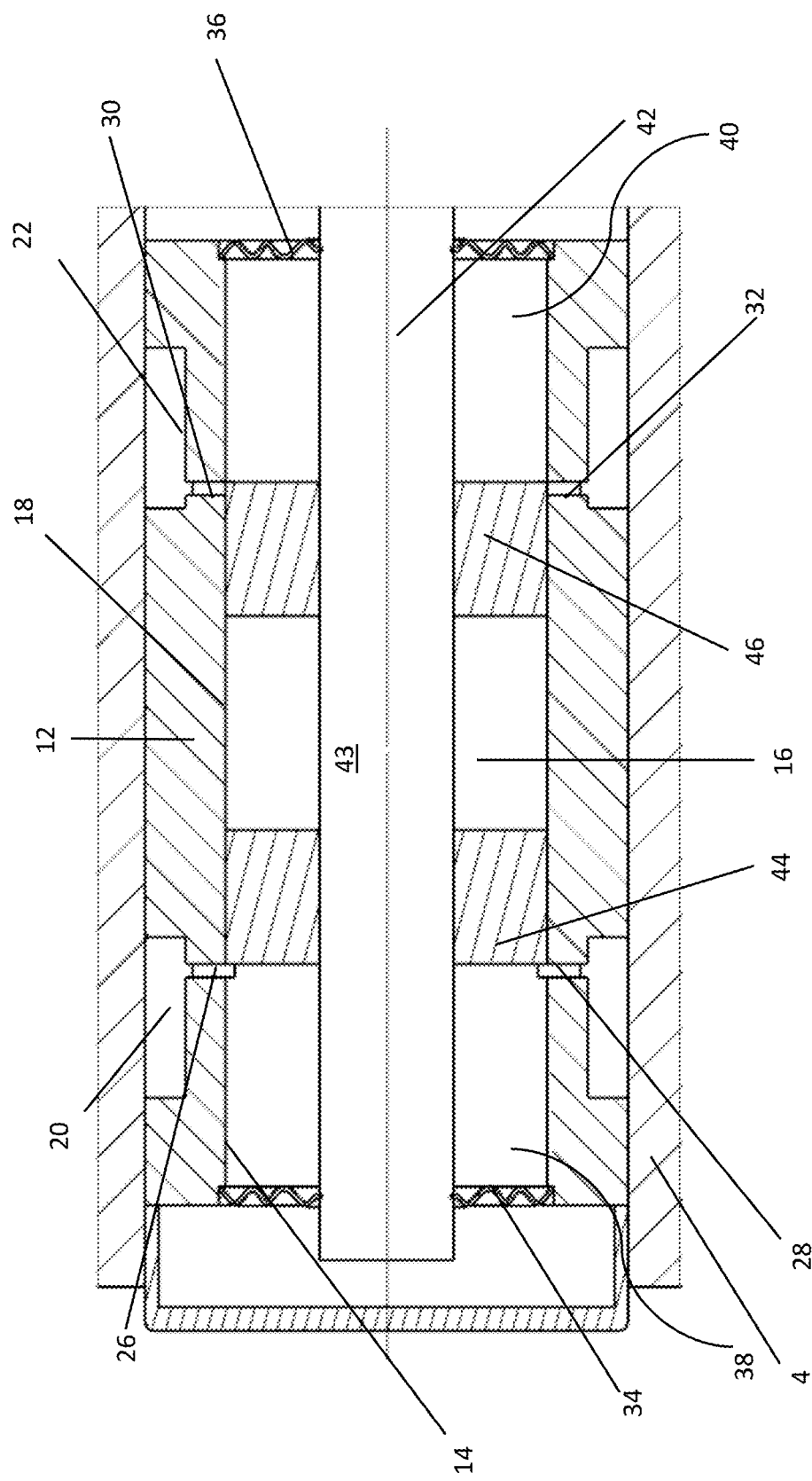
FIG. 7 is a close up of the metering rod in a third position of the servo valve in the same embodiment.

In a third position, as demonstrated by FIG. 7, when a solenoid coil of the drive unit 48 is energised 100%, the metering rod 42 is moved along the axis A toward the second end 40 of the cavity 16 such the second metering member 46 overlaps and seals the second pair of metering holes 30, 32 (the fourth and fifth holes 30, 32). Thus, the fluid that is in the cavity 16 is prevented from exiting the cavity 16 through the exhaust pressure port 10 by the second metering member 46. In the third position, the first metering member 44 is simultaneously positioned toward the second end 40 of the cavity 16 relative to the first pair of metering holes 26, 28, such that fluid in the supply pressure port 6 can freely pass into the cavity 16. When the metering rod 42 is in the third position the first spring seal 34 and the second spring seal 36 are extended in a direction along the axis A away from the first end 38 of the cavity 16. The first spring seal 34 and the second spring seal 36 are displaced an equal distance relative to one another along the axis A such that the volume of the cavity 16 remains constant. The displacement of the first spring seal 34 and the second spring seal 36 in the third position is greater than the displacement of the first spring seal 34 and the second spring seal 36 in the second position When the metering rod 42 is in the third position, fluid is free to pass from the supply pressure port 6 into the cavity 16 via the second and third holes 26, 28, then through the control pressure port 8 via the first hole 24, and subsequently into the second side of the actuator 11. Hence, the pressure in the first side of the actuator 11 and the second side of the actuator 11 is equal; it is the supply pressure P.

As the pneumatic fluid passes from the supply pressure port 6 to the cavity 16, the supply pressure $P_s$ within the cavity 16 exerts a force on the first and the second spring seals 34, 36. The pressure applied to the first spring seal 34 by this fluid is equal to the pressure applied by the fluid to the second spring seal 36. As such, the force acting on the first spring seal 34 from the supply pressure $P_s$ is equal and opposite to the force acting on the second spring seal 36 from the supply pressure $P_s$. Thus, there is no net force acting on the metering rod 42 from the pressure within the cavity 16, and so no there is no associated displacement of the metering rod 42 as a result of the pressure in the fluid.

In the third position, as pneumatic fluid is allowed to pass from the supply pressure port 6 to the second side of the actuator 11, the pressure of the fluid in the second side of the actuator 11 is equal to the pressure of the fluid in the supply pressure port 6, the cavity 16 and the first side of the actuator 11. Consequently, the pressure applied to the first face f1 of the piston 7 is equal to the pressure applied to the second face f2 of the piston 7. The second face f2 of the piston 7 is larger than the first face f1 of the piston 7, at least in the illustrated embodiment, hence the force acting on the second face f2 of the piston 7 is larger than the force acting on the first face f1 of the piston 7 and so the piston 7 extends fully in a direction toward the first side of the actuator 11.

Whilst the function of the servo valve 2 has been described with reference to the metering rod 42 in three different positions, the servo valve 2 may take any position in between the first and third positions to achieve the desired actuator extension.

With reference again to FIG. 1, a drive unit 48 is provided to reciprocate the metering rod 42 along the axis A. The drive unit 48 may be a direct single solenoid drive 48. In this way, improved calibration and control can be achieved through a linear relationship of excitation and displacement. However, it is envisaged that other driving mechanisms may be suitable for driving the metering rod 42 into the different positions.

The drive unit 48 may comprise a drive unit housing 50 as shown in FIG. 1, which attaches to the valve housing 4. The drive unit housing 50 may be made of metal such as a non-magnetic stainless steel. Such a material provides improved high temperature strength offering mechanical protection to the other components of the direct single solenoid drive 48. The drive unit housing 50 may also be made of any other material that offers suitable thermal properties.

At a first end 52 of the drive unit 48 a soft magnetic adjustable core 54 is disposed. The adjustable core 54 has a first portion 56 and a second portion 58. The first portion 56 of the adjustable core 54 is threaded with a thread 59 and partially disposed through the drive unit housing 50. A corresponding thread 51 is provided in the drive unit housing 50. Thus, by rotating the first portion of the adjustable core 54 about the axis A, the adjustable core 54 can be moved along the axis A in a direction either closer to the cavity 16 or away from it, depending on the direction of rotation.

The drive unit 48 further comprises a soft magnetic plunger 62, having a first end 64 spaced from the second portion 58 of the adjustable core 54. The space between the second portion 58 and the first end 64 of the plunger 62 can be adjusted through rotation of the adjustable core 54 about axis A. By adjusting the (air) gap between the first end 64 of the plunger 62 and the second portion 58 of the adjustable core 54 the resistance within the drive unit 48 can be altered. Thus, the current/displacement characteristics of the solenoid can be influenced by adjusting said gap.

For example, an end of the adjustable core 54 extending out of the drive unit housing 50 may be provided with a torque transferring feature 78, for example for applying torque using a tool such as an allen key, a screw driver, a socket driver, etc., to rotate the adjustable core with respect to the screw thread and change the relative position of the adjustable core 54 with respect to the solenoid 68.

The soft magnetic plunger 62 may have a frusto-conical portion or tip 76 at one end which overlaps with a frusto-conical recess 74 of the adjustable core 54 for adjusting the flux strength. The other end of the plunger 62 is configured to attach to an end of the metering rod 42 extending through the second spring end 40 of the cavity 16. Thus the plunger 62 may comprise a threaded recess 63 for threaded engagement with an end of the metering rod 42. The soft magnetic plunger 62 is arranged for reciprocating movement along the axis A.

A solenoid 68 is also disposed within the drive unit housing 50. The solenoid 68 is arranged to surround an extent of the plunger 62 and a portion of the core 54. The solenoid 68 is configured so that when it is energised, the solenoid 68 urges the plunger 62 away from the cavity 16 of the servo valve 2 (i.e., pulled to the right of the figure in FIG. 1) against the bias of the spring seals 34, 36. The solenoid 68 may have ceramic insulation around the windings to improve thermal insulation of the coils disposed therein. The solenoid 68 may be energised by any desired command current so as to achieve the necessary flow requirements within the servo valve 2.

A soft magnetic pole 70 is provided surrounding the second portion 58 of the adjustable core 54.

A soft magnetic pole 72 is provided to surround part of the plunger 62.

The poles 70, 72, the plunger 62 and the core 54 may all comprise soft magnetic materials. The drive unit 48 may comprise no permanent magnets, thus giving it improved performance at higher temperatures where permanent magnets typically demonstrate a drop in their magnetic properties.

When the metering rod 42 is in the first position the solenoid 68 is de-energised. No electromagnetic forces act on the soft magnetic plunger 62 leaving it positioned toward the cavity 16 due to the bias of the first spring seal 34 and the second spring seal 36 in their equilibrium positions.

When the metering rod 42 is in the second position a command current has been applied to the solenoid 68 to energise it to a 50% state. An electromagnetic force is produced by the solenoid 68 that acts on the plunger 62, urging it into an intermediate position such that the plunger is moved away from the cavity 16 to open the metering holes by 50%.

When the metering rod 42 is in the third position a command current has been applied to the solenoid 68 to energise it to a 100% state. An electromagnetic force is produced by the solenoid 68 that acts on the plunger 62, urging it to a fully extended position such that the plunger is moved further away from the cavity 16.

Whilst the direct single solenoid drive is described here at three different solenoid energy states, the coil may be energised to any state desired so as to move the metering rod 42 to any position to meter a desired flow of fluid within the servo valve 2. In addition, while the drive unit 48 is shown as one which returns the metering rod 42 to a position where the first pair of metering holes 26, 28 are closed off when the power is switched off, the drive unit 48 could be set up to overcome a biasing force of a spring arrangement which returns the metering rod 42 to an alternative position in the event of no electrical power. The drive unit 48 could also be arranged on the other end of the cavity to push the metering rod 42 rather than pull it.

Thus at least in the illustrated embodiments, the direct drive assembly may be protected from the ambient by a stainless steel cover. The servo valve, due to lack of O-rings and use of ceramic insulation on wire of the coils, may be far more resistant to higher temperatures than known servo valves. It may be utilized to control the airflow in the engine bleed system where high temperatures occur. A lack of permanent magnets also helps in such high temperature environments (where usually magnetic properties drop with increase in temperature). Further by changing the size of the metering holes in the sleeve, one can change the flow capacity of the servo valve to any desired value, including high flow rates, without increasing the overall size of the assembly. The servo valve may maintain a compact size compared to known valves. It may provide a single stage pneumatic servo valves for use in aircraft air management systems, such as but not limited to engine bleed, cabin air conditioning, pressurization or wing and cowl anti ice protection. It has a modular design and offers the possibility of using different sleeves with various metering hole sizes. The stroke characteristic can be adjusted by use of a variable air gap, allowing a fast and easy process of calibration.

The invention claimed is:

1. A servo valve for an actuator, the servo valve comprising:
a housing having a plurality of ports;
a sleeve disposed within the housing, the sleeve comprising an axis (A), an inner surface defining a cavity for the servo valve and a plurality of metering holes, each in communication with one of the ports;
a metering rod extending axially in the cavity for reciprocation along the axis to meter flow through the metering holes wherein the metering rod comprises metering members arranged along the metering rod, wherein each metering member is arranged to meter flow into and out of the cavity by sliding over to occlude and reveal the metering holes and wherein each metering member has an area when viewed along the axis of the sleeve that is smaller than a cross-sectional area of the cavity such that fluid is allowed to pass within the cavity in an axial direction from one side to the other of each metering member;
a first spring seal extending between the metering rod and the sleeve or housing to close off a first end of the cavity, the first spring seal being fixedly attached to a first point of the metering rod and to the sleeve or the first spring seal being fixedly attached to a first point of the metering rod and the housing; and
a second spring seal extending between the metering rod and the sleeve or housing to close off a second, opposite end of the cavity, the second spring seal being fixedly attached to a second point of the metering rod and the sleeve or the second spring seal being fixedly attached to a second point of the metering rod and the housing;
wherein the first spring seal and the second spring seal each have an equilibrium position that biases the metering rod to a first position; and
wherein the first spring seal and second spring seal permit axial movement of the metering rod to a different position by deforming elastically against their spring biases in a direction along the axis (A) while remaining fixedly attached to the metering rod and to the sleeve or while remaining fixedly attached to the metering rod and to the housing; and
wherein the first spring seal and the second spring seal are in fluid communication with one another in an axial direction of the cavity such that pressure applied to the first spring seal by fluid in the cavity is the same and equal to the pressure applied by the fluid in the cavity to the second spring seal.

2. The servo valve as claimed in claim 1, wherein the first and second spring seals are configured to generate equal and opposite amounts of spring force from a given pressure within the cavity.

3. The servo valve as claimed in claim 2, wherein the first and second spring seals have substantially the same spring constant in a direction along the axis (A).

4. The servo valve as claimed in claim 1, wherein the first and second spring seals comprise metal diaphragms.

5. The servo valve as claimed in claim 4, wherein the metal diaphragms are formed of steel.

6. The servo valve as claimed in claim 1, wherein the first and second spring seals are of equal area and have matching profiles, the second spring seal reversed with respect to the first spring seal.

7. The servo valve as claimed in claim 1, wherein the first and second spring seals comprise bellow springs.

8. The servo valve as claimed in claim 1, wherein the housing comprises a supply pressure port, an exhaust pressure port and a control pressure port, the control pressure port being in communication with the cavity through a hole positioned between metering holes for the supply pressure port and exhaust pressure port.

9. The servo valve as claimed in claim 8, wherein the servo valve is a three way single stage pneumatic servo valve.

10. The servo valve as claimed in claim 1, wherein the servo valve comprises a first pair of metering holes and a second pair of metering holes, the metering holes of the first pair of metering holes being arranged opposite the second pair of metering holes within the sleeve.

11. The servo valve as claimed in claim 10, wherein the first pair of metering holes and the second pair of metering holes are equidistant from a port that the first pair of metering holes and the second pair of metering holes are in communication with.

12. The servo valve as claimed in claim 10, wherein the sleeve is cylindrical and the first pair of metering holes and the second pair of metering holes are arranged to communicate with a port via an annular recess provided in an outer surface of the sleeve.

13. The servo valve as claimed in claim 1, wherein the servo valve comprises a direct single solenoid drive to reciprocate the metering rod along the axis (A).

14. The servo valve as claimed in claim 13, wherein the sleeve is secured within the housing with an interference fit.

15. The servo valve as claimed in claim 1, wherein the first and second spring seals are connected to the sleeve for closing off the ends of the cavity, wherein the sleeve is received within the housing as a replaceable cartridge.

16. The servo valve as claimed in claim 1, wherein the servo valve comprises a gasket seal for sealing against an actuator.

17. An air management system comprising the servovalve as claimed in claim 1 and the actuator.

18. A method of making a servo valve comprising:
forming a plurality of ports in a housing;
forming a sleeve for location within the housing, the sleeve comprising an axis (A), an inner surface defining a cavity for the servo valve and a plurality of metering holes, each in communication with one of the ports;
introducing a metering rod axially into the cavity for reciprocation along the axis to meter flow through the metering holes, wherein the metering rod comprises metering members arranged along the metering rod, wherein each metering member is arranged to meter flow into and out of the cavity by sliding over to occlude and reveal the metering holes and wherein each metering has an area when viewed along the axis of the sleeve that is smaller than a cross-sectional area of the cavity such that fluid is allowed to pass within the cavity in an axial direction from one side to the other of each metering member;
connecting a first spring seal to the metering rod and the sleeve or to the metering rod and the housing such that the first spring seal is fixedly attached to a first point of the metering rod and to the sleeve or the first spring seal is fixedly attached to a first point of the metering rod and the housing, wherein the first spring seal closes off a first end of the cavity;
connecting a second spring seal to the metering rod and the sleeve or to the metering rod and the housing such that the second spring seal is fixedly attached to a second point of the metering rod and the sleeve or the second spring seal is fixedly attached to a second point of the metering rod and the housing, wherein the second spring seal closes off a second end of the cavity opposite the first end of the cavity;
wherein the first spring seal and the second spring seal each have an equilibrium position that biases the metering rod to a first position; and
wherein the first spring seal and second spring seal permit axial movement of the metering rod to a different position by deforming elastically against their spring biases in a direction along the axis (A) while remaining fixedly attached to the metering rod and to the sleeve or while remaining fixedly attached to the metering rod and to the housing;
wherein the first spring seal and second spring seal are in fluid communication with one another in an axial direction of the cavity such that the pressure applied to the first spring seal by fluid in the cavity is the same and equal to the pressure applied by the fluid in the cavity to the second spring seal; and
sliding the sleeve within the housing.

* * * * *